United States Patent [19]

Braden et al.

[11] Patent Number: 5,415,785
[45] Date of Patent: May 16, 1995

[54] METHOD FOR REMOVING A CYANIDE CONTAMINANT FROM REFINERY WASTE WATER STREAMS

[75] Inventors: Michael L. Braden; Veronica K. Braden, both of Sugar Land, Tex.; Manian Ramesh, Naperville; Everett C. Phillips, Batavia, both of Ill.

[73] Assignee: Nalco Chemical Company, Naperville, Ill.

[21] Appl. No.: 138,351

[22] Filed: Oct. 18, 1993

Related U.S. Application Data

[63] Continuation-in-part of Ser. No. 118,022, Sep. 8, 1993, Pat. No. 5,387,393, which is a continuation-in-part of Ser. No. 989,297, Dec. 11, 1992, abandoned.

[51] Int. Cl.$^6$ .................................. C02F 1/78
[52] U.S. Cl. .................................. 210/752; 208/254 R; 210/756; 210/758; 210/760; 210/763; 210/904; 423/236
[58] Field of Search .................. 208/254 R; 210/749, 210/752, 757, 758–760, 763, 765, 904, 756; 423/236

[56] References Cited

U.S. PATENT DOCUMENTS

| | | | |
|---|---|---|---|
| 2,687,999 | 8/1954 | Bott et al. | 210/904 |
| 4,071,448 | 1/1978 | Watanabe et al. | 210/904 |
| 4,312,760 | 1/1982 | Neville | 210/724 |
| 4,419,247 | 12/1983 | Tenny | 210/726 |
| 4,508,683 | 4/1985 | Doll et al. | 210/904 |
| 4,743,381 | 5/1988 | Bull | 210/759 |
| 4,822,496 | 4/1989 | Griffiths et al. | 210/721 |
| 4,978,366 | 12/1990 | Weers | 44/334 |
| 5,074,991 | 12/1991 | Weers | 208/236 |
| 5,093,007 | 3/1992 | Domvile | 210/713 |
| 5,137,642 | 8/1992 | Castrantas et al. | 210/759 |

FOREIGN PATENT DOCUMENTS

| | | | |
|---|---|---|---|
| 50008369 | 1/1975 | Japan | 210/904 |
| 75027308 | 9/1975 | Japan | 210/904 |

Primary Examiner—Peter C. Hruskoci
Attorney, Agent, or Firm—Robert A. Miller; James J. Drake

[57] ABSTRACT

A method for reducing cyanide contaminants in refinery waste waters prior to reuse or release into the environment comprising adding to the waters a cyanide reactive scavenger comprising at least one amine-aldehyde reaction product.

16 Claims, 2 Drawing Sheets

FIG. I

METHOD FOR REMOVING A CYANIDE CONTAMINANT FROM REFINERY WASTE WATER STREAMS

This is a continuation in-part of United States Ser. No. 08/118022 filed on Sep. 8, 1993, now U.S. Pat. No. 5,387,393 which is a continuation-in-part of U.S. Ser. No. 07/989,297 filed on Dec. 11, 1992, now abandoned.

FIELD OF THE INVENTION

The present invention relates to a method for chemically reducing a cyanide contaminant in sour waste water streams in refineries and petrochemical facilities. More particularly, the present invention relates to a method for chemically reducing a cyanide contaminant in sour water stripper bottoms by reacting the cyanide with a cyanide reactive scavenger.

BACKGROUND OF THE INVENTION

During hydrocarbon refining and processing, large quantities of water are used for many difference purposes. For example, water is used: (1) for heating and cooling; (2) for generating steam; (3) to wash hydrocarbon streams; and (4) to wash down spills. All of this water must be treated in waste water treatment facilities or systems before the water can be safely reused in the refinery or re-introduced into the environment.

Refinery waste waters are generally contaminated with a variety of undesirable chemicals agents that must either be removed or rendered harmless before the water can be reused in or released from the facility. A particularly dangerous and frequently encountered contaminant is hydrogen cyanide (HCN) or its salts, collectively referred to as cyanide.

Typically, waste waters contaminated with volatile contaminants such as HCN and hydrogen sulfide are initially subjected to steam stripping which removes some of the volatiles, especially hydrogen sulfide, from the waters as an overhead stream. However, the water effluent stream from the steam stripper, commonly referred to as sour water stripper bottoms, still contains unacceptable levels of contaminants including cyanide.

Generally, the remaining cyanide is reduced or removed from the sour water stripper bottoms by either oxidizing the cyanide or complexing it with transition metals to form cyano-transition metal complexes. Numerous patents describe these and similar methods for cyanide reduction or removal including the following representative patents: U.S. Pat. No. 4,822,496 issued Apr. 18, 1989 to Griffiths et al.; U.S. Pat. No. 4,419,247 issued Dec. 6, 1983 to Tenny; U.S. Pat. No. 4,312,760 issued Jan. 26, 1982 to Neville; U.S. Pat. No. 5,093,007 issued Mar. 3, 1992 to Domvile; U.S. Pat. No. 5,137,642 issued Aug. 11, 1992 to Castrantas et al.; and U.S. Pat. No. 4,743,381 issued May 10, 1988 to Bull, herein incorporated by reference.

However, these methods typically involve treating the waters with strong oxidants and/or various transition metals; each method has its own drawbacks. Strong oxidants require special auxiliary equipment for generation, handling and introduction of the oxidants into the waters. Such equipment is expensive and subject to breakdown and to corrosion by the oxidants. Transition metal complexation may affect metal concentrations in waters being released into the environment or reused in facility. Thus, it would be highly desirable to have a method for removing or rendering harmless cyanide that does not require expensive auxiliary equipment and does not utilize highly reactive oxidants or require transition metals.

SUMMARY OF THE INVENTION

Figure 1:
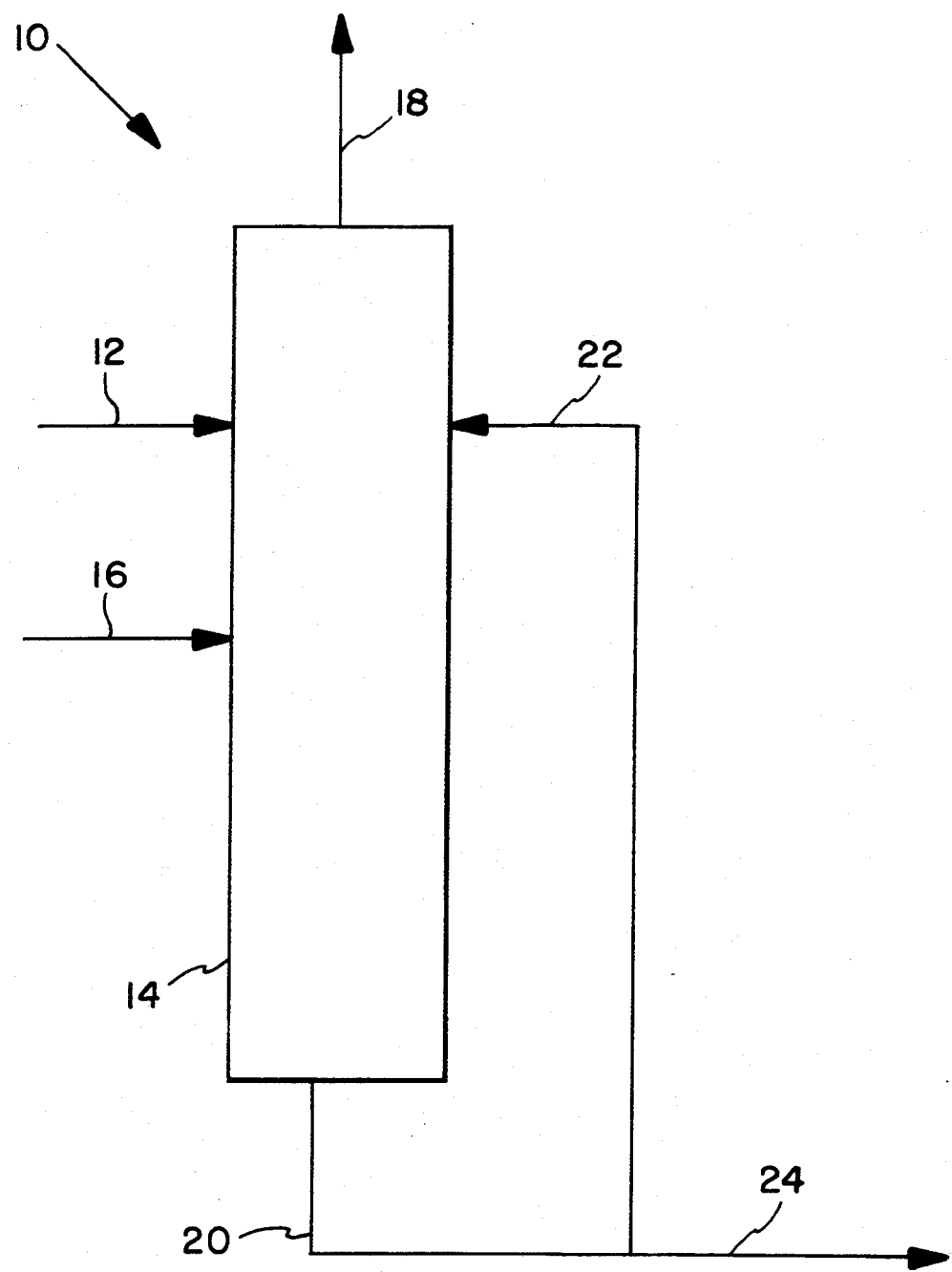
FIG. 1 is a schematic diagram of a sour water stripper unit and connected feed, recycle and effluent piping.

The present invention provides a method for decreasing an active concentration of cyanide compounds in waste waters to meet current and future clean water standards or to achieve any desirable target concentration.

The method comprises adding a sufficient amount of a cyanide reactive scavenger comprising at least one amine-aldehyde reaction product to sour water stripper bottoms to lower the cyanide concentration in the bottoms. The amine-aldehyde reaction products are obtained by reacting one or more amines with one or more aldehydes in a molar ratio from about 2 to 1 to about 1 to 2 of NH group equivalents in the amines to aldehyde equivalents in the aldehydes.

DETAILED DESCRIPTION OF THE INVENTION

Typically, waste water streams from refineries and petrochemical facilities contain a variety of contaminants including cyanides, sulfides, ammonia, phenolics, and hydrocarbons. These contaminants can be present in a wide range of concentrations, but, typically, waste water streams contain only parts per million of each of these contaminants.

One type of particularly troublesome contaminant is cyanide. The cyanide of greatest concern in waste water management is HCN and its water soluble salts. The water soluble salts of most concern are the alkali metal salts and the cyanide salts of zinc, cadmium, nickel, and copper. Of particular concern are sodium and potassium cyanides which are formed by the reaction of HCN with caustic, i.e., in aqueous solutions having a pH greater than the $pK_a$ value for HCN.

We have found that sour waste waters containing low, but measurable, levels of total cyanide can be effectively treated to lower the total cyanide level below a desired concentration by treating the waters with cyanide reactive scavengers. The preferred, desired total cyanide concentration is less than 0.5 ppm (500 ppb) with a concentration less than 0.1 ppm (100 ppb) being particularly preferred.

It should be recognized by ordinary artisans that there are two types of cyanide generally present in refinery streams so-called total and free cyanide. Free cyanide is that portion of the total cyanide that can be removed by reaction with cyanide scavengers. The other cyanides that make up the total cyanide include cyanide complexed to metals such as iron, zinc, and the like. These metal cyanides are not generally removed by scavengers and are generally removed by other methods like oxidation.

The cyanide reactive scavengers of the present invention comprise at least one amine-aldehyde reaction product. A particularly preferred class of amine-aldehyde reaction products of the present invention are amineformaldehyde reaction products.

The amine-aldehyde reaction products useful in the present invention can be prepared by reacting amines with aldehydes under thermal or chemical dehydration reaction conditions where the water of reaction is removed from the reacting system to force the reaction to completion. The water of reaction can be removed by any method well known in the art including straight or azeotropic distillation. Of course, direct separation methods may also be used when the reaction product is water insoluble as well as methods to remove the water through selective chemical reaction. It should also be recognized that water removal can involve the use of semi-permeable membranes or other selective transport methods which will selectively remove water from a system.

Typically, the amine-aldehyde reaction products of the present invention are obtained by reacting amines with aldehydes in molar ratios of from about 2 to 1 to about 1 to 2 of NH group equivalents in the amines to aldehyde group equivalents in the aldehydes. The preferred ratios are between about 1 to 1 to about 2 to 1 of NH group equivalents to aldehyde group equivalents.

Generally, the reaction between amines and aldehydes, particularly when the aldehyde is other than formaldehyde, is exothermic. If the exotherm of the reaction is not carefully controlled, then the reaction products of the present invention can also contain various enamines. The presence or absence of enamines does not affect the cyanide reactivity of the reaction products of the present invention and the enamines are considered a component of the reaction product between amines and aldehydes and therefore a component of the cyanide reactive scavengers of the present invention.

The amines suitable for use in the preparation of the amine-aldehyde reaction products of the present invention include amines of formula (I)

$$R^1R^2NH \qquad (I),$$

polyamines of formula (II)

$$HN(R^3)-Y-N(R^4)H \qquad (II),$$

or mixtures thereof, where $R^1$ and $R^2$ are independently a H atom, a linear or branched C1 to C14 alkyl radical, a C5 to C6 cycloalkyl radical, a $(CH_2)_n-OR^6$ radical, where $R^6$ is a linear or branched C1 to C5 alkyl radical and n is an integer having a value from 2 to about 5, or where $R^1$ and $R^2$ are joined together to from a 2 to 8 membered heterocyclic ring with the nitrogen atom and where the ring atoms can be C, O, N, or mixtures thereof. $R^3$ and $R^4$ are independently a H atom, a C1 to C14 alkyl radical, a C5 to C6 cycloalkyl radical, a $(CH_2)_n-OR^6$ radical, or where $R^3$ and $R^4$ are joined together to form a 2 to 8 membered heterocyclic ring with the two nitrogen atoms and where the atoms in the ring can be C, O, N, or mixtures thereof, and where Y is a C1 to C6 alkenyl radical, or a $-(C_pH_{2p}A)_kC_pH_{2p}$- radical where A is NH or O, p is an integer having a value from about 2 to about 4, and k is an integer having a value from 1 to about 6.

The aldehydes suitable for use in the preparation of the reaction products of the present invention include aldehydes of formula (III)

$$R^5CHO \qquad (III),$$

polyaldehydes of formula (IV)

$$OHC-Z-CHO \qquad (IV),$$

or mixture thereof, where $R^5$ is H, a linear or branched C1 to C14 alkyl radical, a C5–C8 cycloalkyl radical, an aryl radical, an alkylaryl radical or an arylalkyl radical and Z is a C2 to C8 alkenyl radical, an aldehyde substituted C2 to C8 alkenyl radical, an aryl radical, an aldehyde substituted aryl radical, or the like.

The amines of formula (I) suitable for use in the present invention include, without limitation: (1) primary amines such as ammonia, methylamine, ethylamine, propylamine, isopropylamine, butylamine, isobutylamine, sec-butylamine, 2-ethylhexylamine, dodecylamine, and the like; or (2) secondary amines such as dimethylamine, diethylamine, methylethylamine, dipropylamine, diisopropylamine, methylbutylamine, dibutylamine, di-(2-ethylhexyl)amine, didodecylamine, and the like; and cyclic and heterocyclic amines such as morpholine, 3-methylaminopyridine, piperidine, N-(2'-aminoethyl)-piperidine, and the like.

Polyamines of formula (II) suitable for use in present invention include, without limitation, N,N-dimethylaminopropylamine, ethyl-4-aminopentylamine, ethylenediamine, propylenediamine, diethylenetriamine, triethylenetetramine, tetraethylenepentamine, bishexamethylenetriamine, and the like.

Morpholine, dibutylamine, dimethylamine, and diisopropylamine are particularly preferred amines.

Aldehydes of formula (III) suitable in the preparation of the reaction products of the present invention include, without limitation, formaldehyde, acetaldehyde (ethanal), propanal, butanal, hexanal, heptanal, benzaldehyde, and the like. Polyaldehydes of formula (IV) suitable in the preparation of the reaction products of the present invention include, without limitation, adipaldehyde, terephthalic acid aldehyde and the like. The aldehydes of the present invention can be used in the form of free aldehydes or as cyclic trimers such as paraformaldehyde.

Formaldehyde and paraformaldehyde are particularly preferred aldehydes.

Several chemical components make up the amine-aldehyde reaction products of the present invention. Diaminomethanes depicted by formula (V) represent one such component:

$$R^7R^8N-CH(R^9)-NR^{10}R^{11} \qquad (V)$$

where $R^7$, $R^8$, $R^{10}$, and $R^{11}$ are derived from the substituents described for the amines of formula (I) and the polyamines of formula (III) and where $R^9$ is derived from the substituents described for the aldehydes of formula (III) and the polyaldehydes of formula (IV).

Besides the diaminomethanes, amine capped polyoxymethylene ethers of formula (VI) represent another such component:

$$R^{12}R^{13}N-[CH(R^{14})OCH(R^{15})]_q-NR^{16}R^{17} \qquad (VI)$$

where $R^{12}$, $R^{13}$, $R^{16}$, and $R^{17}$ are derived from the substituents described for the amines of formula (I) and the polyamines of formula (III) and where $R^{14}$ and $R^{15}$ are derived from the substituents described for the aldehydes of formula (III) and the polyaldehydes of formula (IV) and where q is an integer having a value between 1 and about 6.

In addition, reaction products prepared from ammonia and formaldehyde can contain predominantly polycyclic amine such as hexamethylenetetramine, and the like.

The exact mixture of diaminomethanes, amine capped polyoxymethylene ethers, and polycyclic amines can vary considerably depending on the exact ratio and type of amines and aldehydes used. The mixture of components can also vary depending on the reaction conditions and manner of addition of the amines and aldehydes.

Additionally, at higher reaction temperature enamines of formula (VII)

$$R^{18}R^{19}N-CH(=R^{20}) \qquad (VII)$$

can also form where $R^{18}$ and $R^{19}$ are derived from the substituents described for the amines of formula (I) and the polyamines of formula (III) and where $R^{20}$ is derived from the substituents described for the aldehydes of formula (III) and the polyaldehydes of formula (IV). It should be recognized that the substituents from which $R^{20}$ is derived must have a CH group α to the carbonyl group of the aldehyde used to prepare the reaction product. Enamines of formula (VII) are also effective in scavenging cyanide. Cyanide salts are thought to first react with enamines in a Michael type reaction and subsequently through a substitution reaction.

Generally speaking, more diaminomethane will be produced when the ratio of NH group equivalents to aldehyde group equivalents is 2 to 1, while increasing amounts of amine capped polyoxymethylene ethers will be produced when the ratio of NH group equivalents to aldehyde group equivalents is less than 2 to 1. In fact, diaminomethanes can be prepared substantially free of amine capped methylene ether by slowly adding the aldehydes to a solution containing the amines such that there are 2 NH group equivalents per aldehyde equivalent. The slow addition of aldehydes and the 2 to 1 ratio of NH group equivalents to aldehyde equivalents almost completely eliminates polyoxymethylene ether formation.

Polycyclic amines are preferentially formed by reacting ammonia with formaldehyde in ratios from about 2 to about 1 and 1 to 1 of NH group equivalents per aldehyde equivalent. For tetramethylenetetramine, the preferred ratio is 2 to 1. Higher reaction temperatures in conjunction with aldehydes other than formaldehyde are conducive to the formation of enamines.

Although the reaction products or mixtures of the present invention are obtained by reacting amines with aldehydes in molar ratios of from about 2 to 1 to about 1 to 2, the preferred ratios for amines of formulas (I) and (II) reacting with aldehydes of formulas (III) and (IV) or mixtures thereof are from about 1 to 1 to about 2 to 1 based on NH group equivalents in the amines and aldehyde equivalents in the aldehydes.

The cyanide reactive scavengers of the present invention can be added to the waste water streams either neat or as a solution. The solution can either be aqueous or organic depending on the relative solubility of the scavengers in water. The solutions can be prepared by dissolving from about 1% to about 50% by weight of the scavenger in a suitable solvent. The solvents can include, without limitation, water, alcohols, aromatic solvent such as toluene or the like, and hydrocarbon solvents such as hexane or gasoline or the like. The preferred solvents are water and alcohols or mixtures thereof. Water and water-alcohol mixtures are preferred because they minimize environmental impact. Of course, for water insoluble scavengers organic solvents must be used. Under these circumstances, emulsions or dispersions of the scavenger-organic solvent system in water can be used as well.

Generally, the scavengers are thought to react with cyanide in a substitution reaction where the cyanide anion displaces one or more of the NH groups of the scavenger as depicted in the reaction scheme shown below between a generic diaminomethane and sodium cyanide:

$$HOH + NaCN + R_2N-CH_2-NR_2 \rightarrow NaOH + R_2NH + R_2N-CH_2-CN$$

Of course, the reaction between cyanide and cyclic or polycyclic amine-aldehyde reaction products would result in ring opening reactions and not displacement reactions. It is also thought that the original cyanide-scavenger product is further reacted in the presence of caustic or at a pH greater than 7 to an amide shown generically below:

$$R_2N-CH_2-C(O)NH_2$$

where R is a generic radical within the meaning of amines described previously as amines suitable for preparing the amine-aldehyde reaction products of the present invention.

Referring now to FIG. 1, refinery waste water streams that contain contaminants such as cyanide, ammonia, sulfides, phenolics, and the like, are generally first steam stripped in a steam stripper, generally 10, to remove volatile components, especially hydrogen sulfide, from the streams. Thus, a waste water feed stream 12 is fed to a stripper column 14 where steam 16 is used to raise the temperature of the feed stream 12. The volatile components in the feed stream 12 are taken overhead as an overhead stream 18 while the higher boiling components (primarily water in this case) are taken off as a bottoms stream 20.

Typically, the overhead stream 18 contains hydrogen cyanide, hydrogen sulfide, ammonia and other volatile components, while the bottoms stream 20, commonly called sour water stripper bottoms, contains non-volatilized HCN, cyanide salts, thiocyanates, non-volatilized sulfides, sulfide salts, non-volatilized ammonia, ammonium salts, phenolics and other high boiling or non-volatile contaminants. Typical sour water stripper bottoms can contain about 1 to about 1,000 ppm ammonia, about 0.1 to about 20 ppm cyanide compounds, about 0.0 up to about 500 ppm sulfides, about 1 to about 1,000 ppm phenolics and about 1 ppm to about 1,500 ppm of total carbon as well as other contaminants. Higher and lower levels of these contaminants can also be encountered.

A part of the bottoms stream 20 is recycled to the steam stripper column 14 as a recycle stream 22 to improve stripper efficiency. Another part is removed as a withdrawn stream 24 for reuse within the refinery or for re-introduction or release into the environment or for both reuse and release.

Although steam stripping reduces the level of HCN in the feed stream, steam stripping is generally ineffective in reducing the cyanide concentration in the withdrawn stream 24 to an acceptably low level. Steam stripping is especially ineffective in reducing the concentration of water soluble cyanide salts. Additionally, steam strippers are designed to maximize the removal of volatile sulfides and not cyanide.

In order to comply with the current and future cyanide release criteria, the cyanide levels in the withdrawn stream 24 generally must be reduced even further. The preferred level of reduction practiced by the method of the present invention is to have a cyanide level in the withdrawn stream 24 of less than 0.5 ppm with less than 0.1 ppm being particularly preferred. However, the present method can be practiced to yield lower or higher cyanide levels.

The method of the present invention includes adding a sufficient amount of a cyanide reaction scavenger to the sour water stripper bottoms stream 24 to reduce a cyanide level in the bottoms stream 24 below a desired target level. The desired target level may be the level necessary to satisfy existing or future clean water standards or any other desired level. The preferred target level is less than 0.5 ppm or 500 ppb with target levels less than 0.1 ppm or 100 ppb being particularly preferred.

The exact amount of the scavengers that must be used to reduce the cyanide concentration in a given sour water stream will vary depending on the original cyanide level in the stream, the temperature of the stream, the pH of the stream, the contact time between the scavenger and the stream, and other factors, but generally, a molar excess of the scavenger is preferable. However, lesser amounts of the scavengers can be used with a concurrent reduction in the amount of scavenged cyanide.

The pH of the stream affects the overall reaction between the cyanide reactive scavengers of the present invention and the cyanide present in sour water stripper bottoms. The preferred pH for practicing the method of the present invention is a pH greater than 5, but pH values less than 5 are equally effective. More particularly, the pH of the bottoms stream 20, the recycle stream 22, and the withdrawn stream 24 should be greater than pH 6. Especially, the streams should have a pH greater than 7.

Stream temperature also affects cyanide scavenging. Generally, the temperature of the stream should be 40° F. or higher. The preferred stream temperature is from about 50° F. to about 200° F. However, lower and higher temperatures can be used provided the equipment maintains the stream in a liquid state, i.e., for temperatures above the boiling point of the stream, the stream would have to be under pressure to remain in a liquid state. Of course, the pressure can also affect contact time and ultimately, cyanide scavenging efficiency. The present invention can be practiced at or near atmospheric pressure or at pressures higher or lower than atmospheric pressure depending on the equipment and operating temperatures.

The contact time also affects cyanide scavenging. Because cyanide levels in the bottoms streams are typically below about 50 ppm and the scavenger is added only in a moderate excess of the cyanide level, the two chemicals must contact each other in order to react. Generally, time and temperature work together in controlling the likelihood of physical contact. The higher the temperature, the shorter the contact time needed to facilitate cyanide scavenging. Conversely, the lower the temperature, the longer the contact time. Typically, the contact times should be at least 5 to 10 minutes at a temperature of about 180° F. Preferably, the contact time should be at least 15 to 20 minutes at room temperature (about 73° F.). However, longer or shorter contact times can be used.

Of course, one of ordinary skill in the art should recognize that the inclusion of a mixer, such as a static mixer, downstream of the point of scavenger addition will affect the time-temperature relationship. Improved mixing generally decreases contact time at a given temperature.

A preferred method for reducing the overall cyanide content in the sour water stripper bottoms stream 20 is to add a first amount of the scavenger to the sour water stripper bottoms recycle stream 22 before the stream is recycled to the steam stripper column 14. The amount of scavenger added to the recycle stream 22 should be sufficient to maintain a molar excess of scavenger to cyanide in the column 14. Preferably, the scavengers should be added in an amount sufficient to maintain at least a 3 to 1 molar ratio of scavenger to cyanide in the column 14. More particularly, the scavengers should be in an amount sufficient to maintain at least a 4 to 1 molar ratio in the column 14.

The scavengers of the present invention can also be added to the waste water feed stream 12, but the addition of scavenger at this point is not preferred because the scavengers may reduce the steam stripping efficiency of the stripper column 14 by reaction with hydrogen sulfide, HCN, or other volatile components.

The preferred scavengers of the present invention for addition to either the feed stream 12 or the recycle stream 22 are scavengers with boiling points higher than the operating temperature of the column 14. Particularly preferred scavengers for introduction into the column 14 are scavengers with a boiling point at least 10° C. higher than the operating temperature of the column 14. Typical operating temperatures of the stripper column 14 are from about 80° C. to about 95° C. or about 180° F. to about 200° F. Preferred scavengers include amine-formaldehyde reaction products, where the amine is an amine of formula (I) where $R^1$ and $R^2$ are independently a linear C4 to C12 alkyl radical.

Secondly, an additional amount of scavenger is added to the withdrawn stream 24 to maintain an excess of scavenger to cyanide in the withdrawn stream 24. Again, a 3 to 1 molar ratio is preferred, while a 4 to 1 molar ratio is particularly preferred.

If no analytical method exists to monitor the cyanide content in the feed stream 12, the steam stripper column 14, the recycle stream 22, or the withdrawn stream 24, then the amount of scavenger added in the two steps described above should be at least 10 ppm, based on the number of gallons per minute of the waste water feed stream 12 being fed to the column 14. The preferred addition level should be at least 25 ppm and the particularly preferred addition level should be at least 50 ppm. However, greater or lesser amounts can be used.

Figure 2:
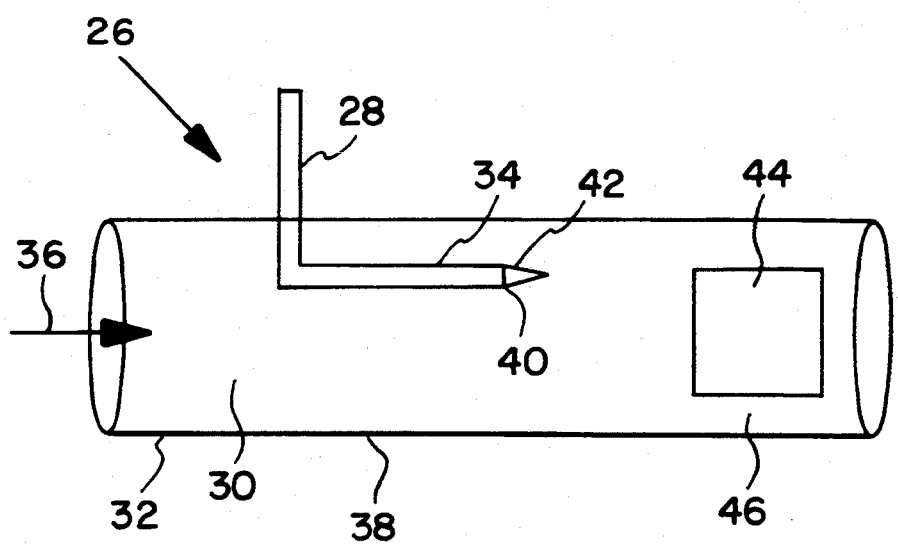
FIG. 2 is a schematic diagram of an injector system for introducing the cyanide scavengers of the present invention.

Referring now to FIG. 2, the manner of addition or introduction of the scavengers of the present invention into the feed stream 12, the sour water recycle stream 22, or the withdrawn stream 24 is by any method commonly practiced in the art. However, a preferred method of adding the scavengers to a stream is to introduce the scavengers into the stream through an injector. One preferred type of injector is a stinger 26. Stingers are generally an L shaped tube 28 which protrudes into an entire region 30 of a pipe 32. In this case the pipe 32 may be associated with the recycle stream 22, the withdrawal stream 24, and/or the feed stream 12. The L shape is adapted to position a distal end 34 of the tube 28 parallel to the pipe 32 and is adapted to orient the distal end 34 in the direction of flow 36 of the stream through the pipe 32. This orientation is designed to ensure that all the scavenger is introduced into the stream and to minimize scavenger adhesion to or contact with an interior wall 38 of the pipe 32.

In the distal end 34 is an orifice 40 where the scavenger exits the tube 28 and enters the stream flow 36. The tube 28 may also be equipped with a nozzle 42 securely affixed to the orifice 40. The nozzle 42 is adapted to increase mixing and dispersion of the scavenger into the stream flowing through the pipe 32. Increased mixing and dispersion of the scavengers in the stream will increase cyanide scavenging efficiency and decrease the time needed for the scavenger to react with the cyanide, i.e., reduce the contact time. The pipe 32 may also be equipped with a mixer 44 located at a position 46 downstream from the stinger 26 to further increase mixing. The mixer 44 may be either in-line or a separate unit through which the stream flows.

One alternate embodiment for reducing cyanide levels in waste waters according to the present invention is to first treat the waters with an amount of the cyanide reactive scavengers in the stripper column 14 followed by treating the withdrawn bottoms stream 24 with an oxidizing agent and/or transition metal complexing agent. Again, the amount of cyanide reactive scavenger should be sufficient to maintain a molar excess of scavenger to cyanide in the stream. However, the previously described amounts are equally applicable to this combined treatment method.

The oxidizing agents suitable to this method of cyanide treatment include, without limitations, inorganic peroxides such as $H_2O_2$, ozone, hypochlorites, peroxy compounds such as organic peroxides, hydroperoxides and peroxyacids, and the like, and solutions thereof and mixtures therof. These oxidizing agents can also include additives and catalysts such as triazines and cupric salts.

The complexing agents suitable to this method of cyanide treatment include, without limitation, iron salts, preferably ferrous salts, cobalt salts, chromium salts, copper salts, and the like solutions thereof and mixtures therof.

This coupled approach provides refiners with greater flexibility in their approach to cyanide reduction and/or removal and is primarily directed toward refiners that have pre-existing oxidation or complexation equipment. The treatment of the waters with the cyanide reactive scavengers of the present invention must be performed upstream from the oxidation or metal complexation to ensure that the scavengers are not oxidized or rendered inactive by these processes. Of course, the amount of cyanide scavenger and oxidizing or complexing agent used should be sufficient in combination to reduce the cyanide content to a desired level. Again, the preferred level is less than 0.5 ppm with less than 0.1 ppm being particularly preferred.

The invention will now be further disclosed in the following illustrative examples where ppm is part per million based on one million parts of the water being analyzed or treated.

EXAMPLE 1

This example illustrates the preparation of amine-aldehyde reaction products of the present invention. Three representative reaction products were prepared using a general synthetic method. Para-formaldehyde was the aldehyde used in this example, but any aldehyde could have been used in its place. Three different amines were used: dimethylamine, di-n-butylamine, and morpholine.

EXAMPLE 2

This example illustrates the cyanide scavenging properties of several amine-aldehyde reaction product scavengers in samples of refinery sour water stripper bottoms. Testing was performed on the refinery stripper bottoms after addition of sodium cyanide because the original concentration of cyanide was below the precision of the analytical method used to detect cyanide.

100 mL samples of a refinery sour water stripper bottoms were adjusted to pH 7.8 by the addition of sulfuric acid. Sufficient sodium cyanide was added to each sample to give 0.4 ppm sodium cyanide. The samples were heated to 110° F. The following amine-formaldehyde reaction product scavengers were used to treat the samples: 1A was the reaction product from Example 1A and 1B was the reaction product from Example 1B.

TABLE 1

| Scavenger | Dose (ppm) | Temp. (°F.) | pH | Cyanide Level (ppm) | % Change in Cyanide Level |
|---|---|---|---|---|---|
| none | 0 | 110 | 7.8 | 0.40 | |
| 1A | 25 | 110 | 7.8 | 0.14 | 65.0 |
| 1A | 50 | 110 | 7.8 | 0.15 | 62.5 |
| 1A | 100 | 110 | 7.8 | 0.05 | 87.5 |
| 1B | 25 | 110 | 7.8 | 0.13 | 67.5 |
| 1B | 50 | 110 | 7.8 | 0.07 | 82.5 |

The data clearly shows that significant reductions in cyanide levels can be achieved using the cyanide scavengers of the present invention.

EXAMPLE 3

In this example a reaction product of dibutylamine and formaldehyde (DBF) prepared from molar ratio of 2 to 1 of dibutylamine to formaldehyde was used to treat sour water stripper bottoms (SWSB) from a commercial refinery.

The DBF was added to the SWSB downstream from the stripper column and downstream from the recycle split. Thus, the SWSB being treated was the withdrawn stream 24. The DBF was added at the indicated ppm level based on the flow rate of the stream in gallons per minute. A sample was removed from the stream downstream from the point of addition and the cyanide level determined according to the standard CNWAD test method.

TABLE 2

| Chemical Dose | SWSB Flow | CNWAD Cyanide ppm | % Removal CNWAD Cyanide |
|---|---|---|---|
| 0 | 196 | 0.07 | 0 |
| 11 | 196 | 0.12 | |
| 0 | 190 | 0.25 | 0 |
| 12 | 190 | 0.255 | |
| 0 | 194 | 0.46 | 34.78 |
| 23 | 194 | 0.3 | |

TABLE 2-continued

| Chemical Dose | SWSB Flow | CNWAD Cyanide ppm | % Removal CNWAD Cyanide |
|---|---|---|---|
| 0 | 192 | 0.125 | — |
| 23 | 192 | 0.095 | 24.00 |
| 0 | 154 | 0.37 | — |
| 46 | 154 | 0.07 | 81.08 |
| 0 | 169 | 0.3 | — |
| 52 | 169 | 0.07 | 76.67 |

The data were consistent with a removal of cyanide with higher doses giving better removal.

EXAMPLE 4

This example illustrates the sensitivity of the cyanide scavengers-cyanide reaction at different temperatures and pH. The scavenger was a dibutylamine-formaldehyde (DBF) reaction product obtained from a molar ratio of 2 to 1 amine to formaldehyde. The stream was a simulated commercial sour water stripper bottoms stream.

The pH of the samples were adjusted to the indicated value by the addition of sulfuric acid. The water was buffered so that the pH of the system would remain essentially constant for the duration of the test using a 0.1M $KH_2PO_4$/0.1M NaOH buffer. To the samples were added sufficient sodium cyanide to result in a 10.4 ppm cyanide concentration. To some of the samples sufficient DBF was added to achieve the ppm concentration reported. The samples were sealed and heated in a constant temperature bath at the indicated temperature for 1 hour. The samples were removed and analyzed for cyanide according to ASTM method #D2036 or standard method #412.

TABLE 3

| Dosage | pH | Temp. (F.) | Initial Cyanide (ppm) | Final Cyanide (ppm) | % Removal |
|---|---|---|---|---|---|
| 0 | 10 | 135 | 10.4 | 10.7 | 0 |
| 0.6 | 10 | 135 | 10.4 | 3.4 | 67 |
| 1 | 10 | 135 | 10.4 | 3.9 | 63 |
| 2 | 10 | 135 | 10.4 | 2.1 | 80 |
| 0 | 10 | 64 | 10.4 | 10.7 | 0 |
| 0.6 | 10 | 64 | 10.4 | 4.6 | 56 |
| 1 | 10 | 64 | 10.4 | 1.3 | 89 |
| 2 | 10 | 64 | 10.4 | 0.5 | 95 |
| 0 | 4.3 | 135 | 10.4 | 10.2 | 2 |
| 0.6 | 4.3 | 135 | 10.4 | 3.7 | 65 |
| 1 | 4.3 | 135 | 10.4 | 3 | 79 |
| 2 | 4.3 | 135 | 10.4 | 0.9 | 91 |
| 0 | 4.3 | 64 | 10.4 | 10.2 | 2 |
| 0.6 | 4.3 | 64 | 10.4 | 3.9 | 63 |
| 1 | 4.3 | 64 | 10.4 | 1.2 | 88 |
| 2 | 4.3 | 64 | 10.4 | 0.4 | 96 |
| 0 | 7.6 | 135 | 10.4 | 8.9 | 14 |
| 0.6 | 7.6 | 135 | 10.4 | 7.5 | 28 |
| 1 | 7.6 | 135 | 10.4 | 4.1 | 61 |
| 2 | 7.6 | 135 | 10.4 | 2.1 | 80 |
| 3 | 7.6 | 135 | 10.4 | 0.52 | 95 |
| 0 | 7.6 | 64 | 10.4 | 8.9 | 14 |
| 0.6 | 7.6 | 64 | 10.4 | 6.7 | 36 |
| 1 | 7.6 | 64 | 10.4 | 2.3 | 78 |
| 2 | 7.6 | 64 | 10.4 | 1.2 | 88 |
| 3 | 7.6 | 64 | 10.4 | 1.1 | 89 |

The data clearly show that: (1) Cyanide is being removed by DBF; (2) Higher DBF dosages increase cyanide removal; (3) pH does not appear to be a significant factor; (4) Temperature does not appear to be a significant factor. However, great cyanide removal is seen at lower temperature; and (4) Blank samples containing 10.4 ppm of cyanide indicated no loss of cyanide at various pHs and temperatures, i.e., the test is accurate or at least precise.

While the illustrative embodiments of the invention have been described with particularity, it will be understood that variations and modifications will be apparent and can be readily made by those skilled in the art without departing from the spirit and scope of the invention.

We claim:

1. A method for chemically reducing a concentration of cyanide contaminants in sour water stripper bottoms streams comprising adding to the bottoms stream a cyanide reactive scavenger comprising a reaction product of one or more amines with one or more aldehydes in a molar ratio from about 1 to 2 to about 2 to 1 of NH group equivalents in the amines to aldehyde group equivalents in the aldehyde, in an amount sufficient to reduce said concentration.

2. The method of claim 1, wherein the scavenger is added to the bottoms stream in an amount sufficient to reduce the cyanide contaminants to a concentration in the bottoms stream of less than 0.5 ppm.

3. The method of claim 2, wherein the scavenger is added to the bottoms stream in an amount sufficient to reduce the cyanide compounds to a concentration in the bottoms stream of less than 0.1 ppm.

4. The method of claim 3, wherein the scavenger is added to the bottoms stream in a sufficient amount to maintain a scavenger to cyanide contaminants molar ratio of at least 3 to 1.

5. The method of claim 1, wherein the scavenger is added to the bottoms stream in a sufficient amount to maintain an molar excess of scavenger to cyanide contaminants in the bottoms stream.

6. The method of claim 3, wherein the scavenger is added to the bottoms stream in a sufficient amount to maintain a scavenger to cyanide contaminants molar ratio of at least 6 to 1.

7. The method of claim 1, wherein the amines are selected from the group consisting of amines of formula (I)

$$R^1R^2NH \qquad (I),$$

polyamines of formula (II)

$$HN(R^3)-Y-N(R^4)H \qquad (II),$$

or mixtures thereof, where $R^1$ and $R^2$ are independently a H atom, a linear or branched C1 to C14 alkyl radical, a C5 to C6 cycloalkyl radical, a $(CH_2)_n-OR^6$ radical, where $R^6$ is a linear or branched C1 to C5 alkyl radical and n is an integer having a value from 2 to about 5, or where $R^1$ and $R^2$ are joined together to from a 2 to 8 membered heterocyclic ring with the nitrogen atom and where the ring atoms are selected from the group consisting of C, O, N, S, or mixtures thereof, and where $R^3$ and $R^4$ are independently a H atom, a C1 to C14 alkyl radical, a C5 to C6 cycloalkyl radical, a $(CH_2)_n-OR^6$ radical, or where $R^3$ and $R^4$ are joined together to form a 2 to 8 membered heterocyclic ring with the two nitrogen atoms and where the atoms in the ring are selected from the group consisting of C, O, N, S, or mixtures thereof, and where Y is a C1 to C6 alkenyl radical, or a $-(C_pH_{2p}A)_kC_pH_{2p}-$ radical where A is NH or O, p is an integer having a value from about 2 to about 4, and k is an integer having a value from 1 to about 6.

8. The method of claim 1, wherein the aldehydes are selected from the group consisting of aldehydes of formula (III)

$$R^5CHO \qquad (III),$$

polyaldehydes of formula (IV)

$$OHC-Z-CHO \qquad (IV),$$

and mixture thereof, where $R^5$ is selected from the group consisting of H, C1 to C6 alkyl radicals, aryl radicals, alkylaryl radicals and aryl alkyl radicals and Z is selected from the group consisting of C2–C8 alkenyl radicals, aldehyde substituted C2 to C8 alkenyl radicals, aryl radicals, and aldehyde substituted aryl radicals.

9. The method of claim 1, wherein the aldehydes are selected from the group consisting of aldehydes of formula (III)

$$R^5CHO \qquad (III)$$

where $R^5$ is H, a C1 to C6 alkyl radical, an aryl radical, an alkylaryl radical or an arylalkyl radical.

10. The method of claim 1, wherein the aldehydes are selected from the group consisting of polyaldehydes of formula (IV)

$$OHC-Z-CHO \qquad (IV)$$

where Z is selected from the group consisting of $C_2$–$C_8$ alkenyl radicals, aldehyde substituted $C_2$ to $C_8$ alkenyl radicals, aryl radicals, and aldehyde substituted aryl radicals.

11. The method of claim 1, wherein the amines are selected from the group consisting of amines of formula (I)

$$R^1R^2NH \qquad (I)$$

or mixtures thereof, where $R^1$ and $R^2$ are independently a H atom, a linear or branched C1 to C14 alkyl radical, a C5 to C6 cycloalkyl radical, a $(CH_2)_n$—$OR^6$ radical, where $R^6$ is a linear or branched C1 to C5 alkyl radical and n is an integer having a value from 2 to about 5, or where $R^1$ and $R^2$ are joined together to form a 2 to 8 membered heterocyclic ring with the nitrogen atom and where the ring atoms are selected from the group consisting of C, O, N, S, or mixtures thereof.

12. The method of claim 1, wherein the amines are selected from the group consisting of amines of formula (II)

$$HN(R^3)-Y-N(R^4)H \qquad (II)$$

where $R^3$ and $R^4$ are independently a H atom, a C1 to C14 alkyl radical, a C5 to C6 cycloalkyl radical, a $(CH_2)_n$—$OR^6$ radical, or where $R^3$ and $R^4$ are joined together to form a 2 to 8 membered heterocyclic ring with the two nitrogen atoms and where the atoms in the ring are selected from the group consisting of C, O, N, S, or mixtures thereof, and where Y is a C1 to C6 alkenyl radical, or a —$(C_pH_{2p}A)_kC_pH_{2p}$— radical where A is NH or O, p is an integer having a value from about 2 to about 4, and k is an integer having a value from 1 to about 6.

13. The method of claim 12, wherein the concentration is reduced to less than 0.5 ppm.

14. A method for chemically reducing a concentration of cyanide contaminants in sour water stripper bottoms streams comprising the steps of:
a) adding to a recycle sour water stripper bottoms stream of a steam stripper column a first amount of a cyanide reactive scavenger comprising a reaction product of an amine and an aldehyde in a molar ratio of from about 1 to 2 to about 2 to 1, where the first amount is sufficient to maintain an excess of the scavenger compared to the cyanide contaminants in the column; and
b) adding to a withdrawn sour water stripper bottoms stream of the column a second amount of the cyanide scavenger, where the first and second amounts of the scavenger are sufficient to reduce the cyanide concentration in the withdrawn stream.

15. The method of claim 14 wherein the concentration is reduced to less than 0.5 ppm.

16. A method for reducing a concentration of cyanide contaminants in sour water stripper bottoms comprising the steps of:
a) adding to a sour water stripper bottoms stream an amount of a cyanide reactive scavenger comprising a reaction product of an amine and an aldehyde in a molar ratio of from about 1 to 2 to about 2 to 1 sufficient to maintain an excess of the scavenger compared to the cyanide contaminants in the stream; and
b) adding to the stream downstream from the scavenger addition of step (a) of the column an amount of an oxidizing agent selected from the group consisting of $H_2O_2$, ozone, hypochlorites, organic peroxides, hydroperoxides and peroxyacids, and solutions thereof and mixtures thereof, and/or a transition metal complexing agent selected from the group consisting of iron salts, ferrous salts, cobalt salts, chromium salts, copper salts; solutions thereof and mixtures thereof, so that the cyanide concentration is reduced to less than 0.5 ppm.

* * * * *